350-6.8
XR 3,818,444 D

United Stat
Connell

[11] 3,818,444
[45] June 18, 1974

[54] OPTICAL BAR CODE READING METHOD AND APPARATUS HAVING AN X SCAN PATTERN

[75] Inventor: Richard Allen Connell, Wilton, Conn.

[73] Assignee: Pitney-Bowes, Inc., Stamford, Conn.

[22] Filed: June 29, 1972

[21] Appl. No.: 267,443

[52] U.S. Cl. .................... 340/146.3F; 340/146.3Z, 340/146.3H, 235/61.11E

[51] Int. Cl. .................... G06k 7/14

[58] Field of Search 340/146.3 K, 146.3 F, 146.3 Z, 340/146.3 AG, 146.3 H; 235/61.11 E; 250/219 D

[56] References Cited

UNITED STATES PATENTS

| | | | |
|---|---|---|---|
| 3,159,814 | 12/1964 | Rabinow | 340/146.3 F |
| 3,417,234 | 12/1968 | Sundblad | 235/61.11 E |
| 3,622,758 | 11/1971 | Schanne | 340/146.3 AG |
| 3,663,800 | 5/1972 | Myer et al. | 250/219 D |
| 3,728,677 | 4/1973 | Munson | 340/146.3 F |

OTHER PUBLICATIONS

Latta, "Laser Raster Scanner" IBM Tech. Disclosure Bulletin, Vol. 13, No. 12, May, 1971, pp. 3,879 and 3,880.

*Primary Examiner*—Paul J. Henon
*Assistant Examiner*—Leo H. Boudreau
*Attorney, Agent, or Firm*—William D. Soltow, Jr.; Albert W. Scribner, Peter Vrahotes

[57] ABSTRACT

An optical code reader employs a flying spot scanner repetitively tracing an X scan pattern to read a linear bar code printed on a ticket regardless of ticket orientation during movement therepast, wherein the height of the bar code exceeds its length by an amount dependent on the scan pattern repetition rate and the ticket velocity.

4 Claims, 3 Drawing Figures

3818444
OR IN 340/146.3F

OPTICAL BAR CODE READING METHOD AND APPARATUS HAVING AN X SCAN PATTERN

BACKGROUND OF THE INVENTION

The present invention relates to the reading of optical bar codes from a remote position and has particular utility in data acquisition systems developed for retail point-of-sale applications, inventory control, etc. In retail point-of-sale applications, for example, the typical way in which data entry is effected requires that a clerk read sales data from a ticket associated with each item of merchandise and then manually enter this data into the system using a keyboard. Recently, hand-held wands have been developed for scanning machine readable optical and magnetic codes applied to tickets associated with each item of merchandise pursuant to entering the sales data into the system. As can be readily appreciated, the automatic entry of sales data encoded in machine readable form can be effected more rapidly and accurately than manual entry via a keyboard.

The ultimate approach to the problem of data entry in this area appears to be the use of a fixed scanner for reading from a distance machine readable, optically encoded data from a ticket attached to each item while in transit through a reading station. This approach frees the clerk from the task of having to manipulate a wand and also considerably eases the problems of variations in scanning rate inherent in hand scanning. In this approach the principle obstacle to overcome is in providing a fixed scanner capable of rapidly interpreting a machine readable, optical encoded format on the fly, which format is susceptible to being imprinted inexpensively and rapidly on the tickets, tags, labels, etc., at high information packing densities.

SUMMARY OF THE INVENTION

In accordance with the present invention, there is provided a scanner for remotely reading optically encoded data applied to a ticket physically associated with each item moving through a fixed reading station. The scanner of the present invention is uniquely adapted to read the optically encoded data in transit regardless of the orientaion of the ticket moving through the reading station. One of the signal features of the subject scanner is its capability of reading "on the fly" a linear bar code having bi-directional reading capability, but not omni-directional reading capability. That is, a linear bar code can be successfully interpreted by a scanning light beam only if each and every one of the bar and space code elements thereof is intersected by the scanning beam moving in a direction generally along the length of the bar code. This directional reading characteristic of a linear bar code is contrasted with the omni-directional reading characteristics of an annular bar code having code elements in the form of concentric annular rings which can be read by any directional scanning beam intersecting the common center. However, a linear bar code is ideally suited for considerably higher information packing densities, thus permitting the inclusion of more data on a small ticket area. Moreover, a linear bar code can be imprinted on tickets, tags, labels, etc., inexpensively and in large volume with printing equipment capable of use by the retail store personnel. That it, a linear bar code format does not require expensive printing equipment which would necessitate source marking.

The present invention contemplates a method and apparatus for reading a linear bar code using a repetitive optical scan pattern having the optimum number of intersecting, uniformly angularly displaced, successively executed traces to insure that at least one trace of the scan pattern will intersect all elements of the bar code regardless of its orientation in the scan pattern. The optimum number of traces in the scan pattern is determined by the ratio of 180° over the read acceptance angle of the bar code; the angle of 180° (one-half of 360°) signifying that a linear bar code can be read by a linear trace in either of two general directions (assuming appropriate read logic), i.e., forwardly and backwardly, so long as each of the code elements is intersected by the trace. The bar code acceptance angle is determined as being twice the angle whose tangent is equal to the ratio of the bar code height to its overall length.

More specifically, it has been determined, in accordance with the invention, that the optimum trade-off between scanner design and performance considerations and bar code printing considerations is to employ a scan pattern having but two traces perpendicular to each other. This X scan pattern requires that the bar code have an acceptance angle somewhat greater than 90°, meaning that the height of the bar code must somewhat exceed its length. These unique specifications permit the use of a relatively inexpensive scanner of uncomplicated design having the requisite scanning speed to read bar codes on the fly. Moreover the additional printing expense and reduction in information density necessitating larger ticket dimensions are not substantial and are more than offset by the attributes of the scanner. The scanner of the present invention is in the form of a flying spot scanner optically controlled to generate an X scan pattern. The two traces of the X scan pattern, at right angles to each other, are traced alternately at a high repetition rate. In order that the linear bar code be read successfully regardless of its orientation while pausing at, but preferably moving through the X scan pattern, the uniform height of the bar code elements is somewhat greater than the overall length of the bar code. The dimension by which the height of the bar code exceeds its overall length is determined by the repetition rate of the X scan pattern and the maximum expected velocity at which the bar code may be moved through the reading station so as to insure that at least one trace will intersect each of the code elements of the bar code.

In terms of actual structure, the scanner of the present invention employs a scanning beam source, preferably in the form of a laser. The laser beam is divided into two split beams using a beam splitting element; the split beams impinging on a scanning element in the form of a rotating drum having multiply facetted mirror surfaces arrayed around its periphery.

In one disclosed embodiment of the invention, the drum has two channels, with each channel having alternating flat mirrored or reflective surfaces and non-reflective surfaces. The reflective and non-reflective surfaces in the two channels are relatively phased such that while one of the split beams is incident on a reflective surface in one channel the other split beam is incident on a non-reflective surface in the other channel. The parallel sweeps of the two split beams reflected from the drum have their sweep directions rotated 45° in opposite directions by a pair of light rotating elements, such as dove mirrors or dove prisms, in order to generate the X scan pattern of the present invention.

In a second disclosed embodiment of the invention, the drum scanner has but a single channel consisting entirely of a plurality of planar mirror surfaces arrayed around its periphery. The two split laser beams from the beam splitter are directed onto the drum scanner at appropriately phased locations such that as one of the split beams completes its sweep the other split beam is just beginning its sweep. Again, dove prisms or dove mirrors are used to rotate the sweep directions of the beam 45° in opposite directions in order to generate the X scan pattern.

The invention accordingly comprises the feaures of construction, combinations of elements, arrangements of parts and method steps which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Corresponding reference numerals refer to like parts throughout the several views of the drawings.

DETAILED DESCRIPTION

Figure 1:
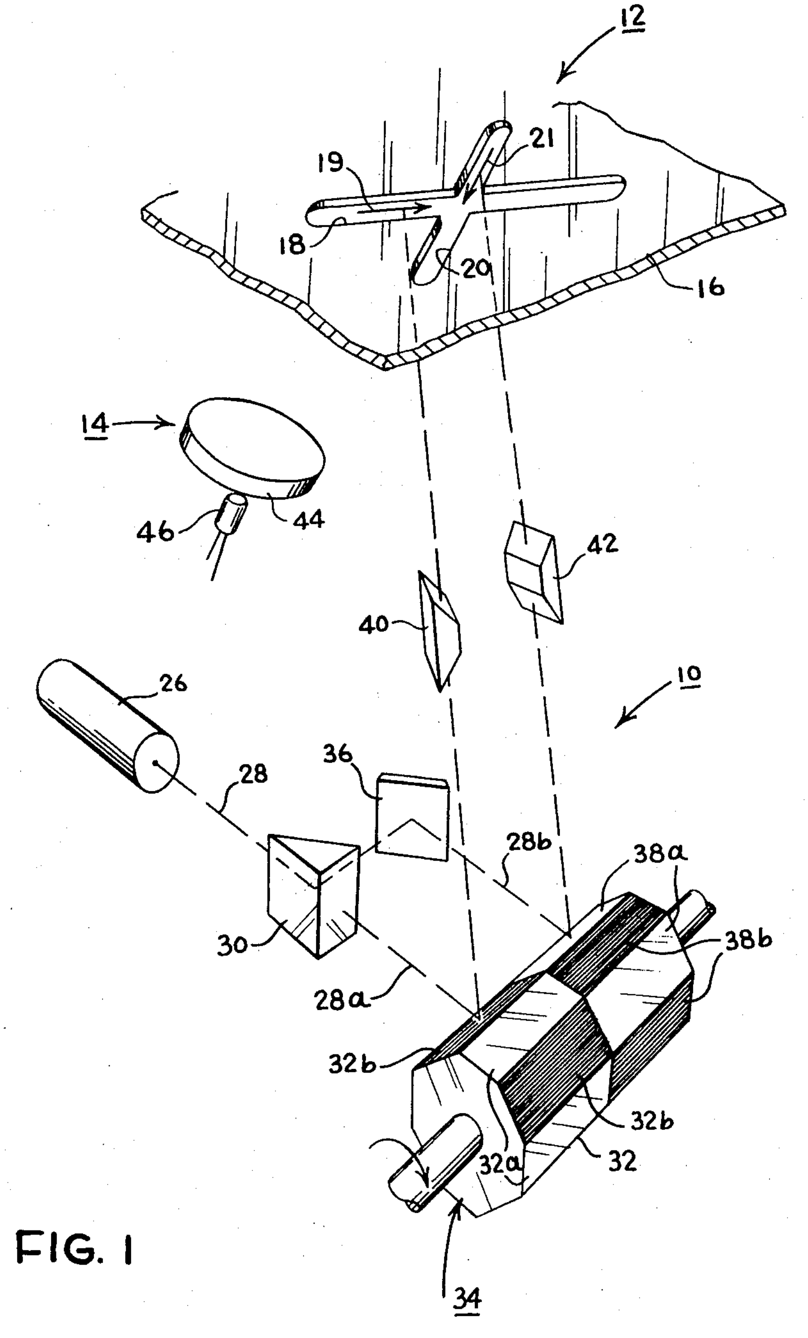
FIG. 1 is a perspective schematic diagram illustrating a first embodiment of the invention.

Referring to FIG. 1, the apparatus of the invention includes a flying spot scanner, generally indicated at 10, for generating an X scan pattern, generally indicated at 12, and a receiver, generally indicated at 14, situated to respond to reflected images of objects moving across the X scan pattern. Scanner 10, in the disclosed embodiment of FIG. 1, is an upward looking scanner in that the X scan pattern 12 is generated in the plane of an upper horizontal supporting surface 16, such as a countertop, on which the objects to be scanned are supported during movement across the X scan pattern. In order to expose the objects to be scanned to scanner 10, countertop 16 is formed with a pair of slots 18 and 20 intersecting at right angles and aligned lengthwise with the two traces (represented by arrows 19 and 21) of X scan pattern 12. Preferably, slots 18 and 20 are inlayed with transparent material, such as glass or plastic, to prevent debris from falling down into the scanner area.

It is contemplated that the objects to be scanned are in the form of machine readable, optically encoded tickets, tags, labels, etc. secured to the bottom surfaces of items or merchandise moved successively across the X scan pattern 12. It will be appreciated that scanner 10 may be adapted as a side looking or downward looking scanner without departing from the teachings of the present invention. However, the upward looking arrangement of FIG. 1 is preferred, since it conveniently avoids the problems of depth of field occasioned by varying sizes of items of merchandise and it permits the positioning of the scanner and receiver in an out-of-the-way location beneath countertop 16.

Still referring to FIG. 1, scanner 10 includes a light source, preferably in the form of a laser 26, for generating a relatively intense light beam 28 of finite cross-section. Beam 28 is split into two beams 28*a* and 28*b* by a beam splitter 30. Suitable optical focusing elements may be employed to reduce the beam size and thus inhance the depth of field and to coordinate the beam size with the code elements to be interpreted. Split beam 28a impinges on a channel 32 of a rotating drum scanner, generally indicated at 34. Split beam 28*b* is reflected by a mirror 36 for impingement on a second channel 38 of drum scanner 34. Each channel of scanner 34 is formed having a polygonal peripheral surface having alternating reflective and non-reflective flat surface segments arrayed around the periphery. That is, channel 32 is formed having flat reflective or mirrored surface segments 32*a* alternating with non-reflective or blackened surface segments 32*b*. Similarly, channel 38 is formed having an annular array of alteranting mirrored 38*a* and blackened 38*b* flat surface segments. It will be noted from FIG. 1 that the mirrored and blackened surface segments in the two channels are relatively phased in their positions such that a mirrored surface segment in one channel is laterally aligned with a blackened surface segment in the other channel. As a consequence, when split beam 28*a* is incident on a blackened surface segment 32*b* in channel 32, split beam 28*b* is incident on a mirrored surface segment 38*a* in channel 38. Thus, only one of these split beams 28*a* and 28*b* is reflected by scanner 34 at a time. Due to the rotation of scanner 34, the reflected one of the split beams is swept through an angle dependent upon the subtended angle of the mirrored surface segments.

It will be appreciated that the geometry of scanner 34 and its rate of rotation are determined by the desired X scan repetition rate and length of traces 19 and 21. Representative specifications are a 36 sided scanner 34 rotating at 1,800 rpm.

Since the sweep directions of the two split beams alternately reflected by scanner 34 are parallel, the sweep direction of one must be rotated 90° or the sweep directions of both must be rotated 45° in opposite directions in order to develop X scan pattern 12, wherein the alternating traces 19 and 21 sweep at right angles to each other. It is deemed preferably to rotate the sweep directions of both split beams so that each passes through corresponding optical elements, and, to this end, identical dove mirrors or prisms 40 and 42 are provided to rotate the sweep directions of the split beams 45° in opposite directions.

Receiver 14 includes a suitable light gathering system 44, which may include appropriate filtering for ambient light, and a photodetector 46 for developing a video signal representative of the individual code elements of the coded ticket, tag, label, etc. moving across the X scan pattern 12.

Figure 2:
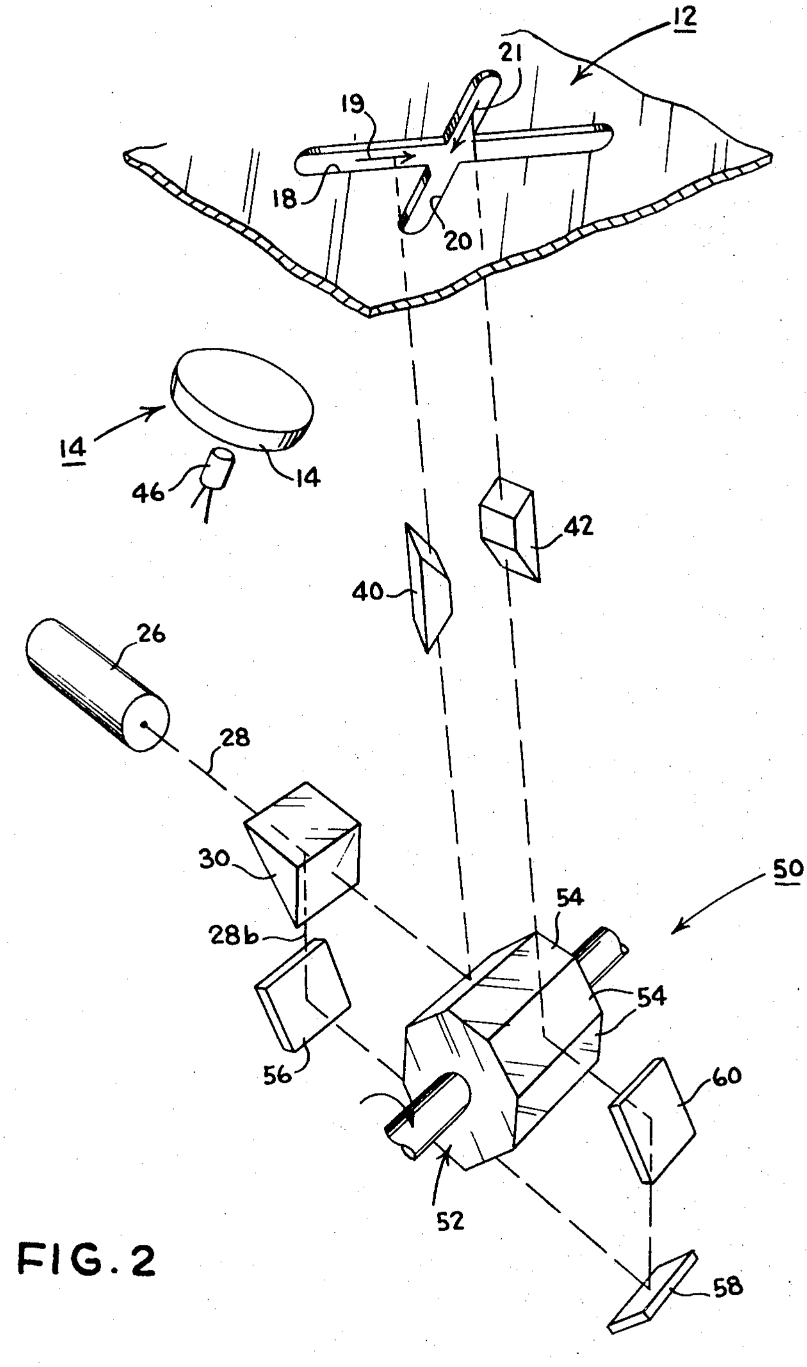
FIG. 2 is a perspective schematic diagram of a second embodiment of the invention.

In FIG. 2 there is shown a modified flying spot scanner, generally indicated at 50, which incorporates certain design economics over the flying spot scanner construction of FIG. 1. Specifically, flying spot scanner 50 utilizes a drum scanner, generally indicated at 52 having but one channel. Rather than having alternating mirrored and blackened surface segments, drum scanner 52 is formed having a polygonal surface periphery in which each flat surface segment 54 arrayed around the periphery is mirrored. The laser output beam 28, as in the embodiment of FIG. 1, is split into two beams 28*a* and 28*b* by a beam splitter 30. Split beam 28*a* impinges on one mirrored surface segment, while the other split beam 28*b* is directed by series of mirrors 56, 58 and 60 for impingement on a different mirrored surface segment. The positions of the mirrors 56, 58 and 60 are established such that the sweeps of the two split beams are relatively out of phase. Thus, when trace 19, produced by each sweep of split beam 28*a*, is moving through its field of view limited by slot 18, trace 21 produced by each sweep of split beam 28*b*, is beyond its field of view limited by slot 20, and vice versa. X scan pattern 12 is thus generated in the embodiment of FIG. 2 as a pair of alternating, mutually perpendicular traces.

It will be appreciated that the traces 19, 21 can be derived from separate scanning or sweep generating elements synchronized to each other. Moreover, rather than dividing a main light beam into split beams, separate beam sources may be utilized.

While the apparatus of FIGS. 1 and 2 is adaptable to reading a variety of optical formats, including those having omni-directional reading capability, the X scan pattern of the present invention is uniquely adapted to reading optical code formats having limited directional reading capability, such as, for example, a linear bar code. It will be appreciated that a scanning trace must intersect all of the bar code elements, and, for this to occur, the rectilinear sweep path must be included within a read acceptance angle which is equal to twice the angle whose tangent is the ratio of the bar code height to its overall length. While it is desirable to reduce this height to length ratio in order to conserve on printing costs and ticket size, this has the effect of reducing the acceptance angle. It will be understood that a linear bar code having a small acceptance angle can be read regardless of orientation by generating a multitude of closely angularly spaced traces in succession, an approach disclosed in British Pat. No. 1,258,476, published Dec. 30, 1971, such that ultimately at least one of the traces will intersect all of the elements of the bar code. In fact, it has been observed that the number of uniformly angularly displaced traces required to read a linear bar code either forward or backward regardless of its orientation is equal to 180° divided by the acceptance angle of the bar code. It will be appreciated that any ticket orientational constrants placed on the operator of a checkout counter equiped with an upward looking linear bar code scanner, particularly, would materially limit the throughput of merchandise items.

It therefore becomes a matter of compromise as between the acceptance angle of the linear bar code and the requisite number of separate traces in the scan pattern to assure the reading of the bar code regardless of its orientation. As noted above, reducing the bar code height has the advantage of economies in printing and label size, however this decreases the acceptance angle and increases the number of traces required for reading regardless of bar code orientation. As the number of traces in the scan pattern increases the scanner construction becomes necessarily more complex and its reading rate is decreased. Consequently, the merchandise items must be moved very slowly through the reading area or field of view and it may be necessary in practice to stop the item therein until a read is obtained, as required in the above-noted British patent. It will also be appreciated that rather than increase the height of the bar code elements so as to increase the acceptance angle, the length of the bar code can be decreased. However this has the distinct disadvantage of limiting the amount of information that can be encoded. This again is a matter of trade-off.

The repetitive X scan 12 of the present invention, consisting of two scans or traces 19 and 21 oriented at right angles to each other, constitutes the optimum compromise between label printing cost, scanner design economy and reading speed. Moreover, with only two traces and the X scan pattern 12 is capable of reading a linear bar code in transit, regardless of its orientation, as long as the height of the bar code is somewhat greater than its overall length.

Figure 3:
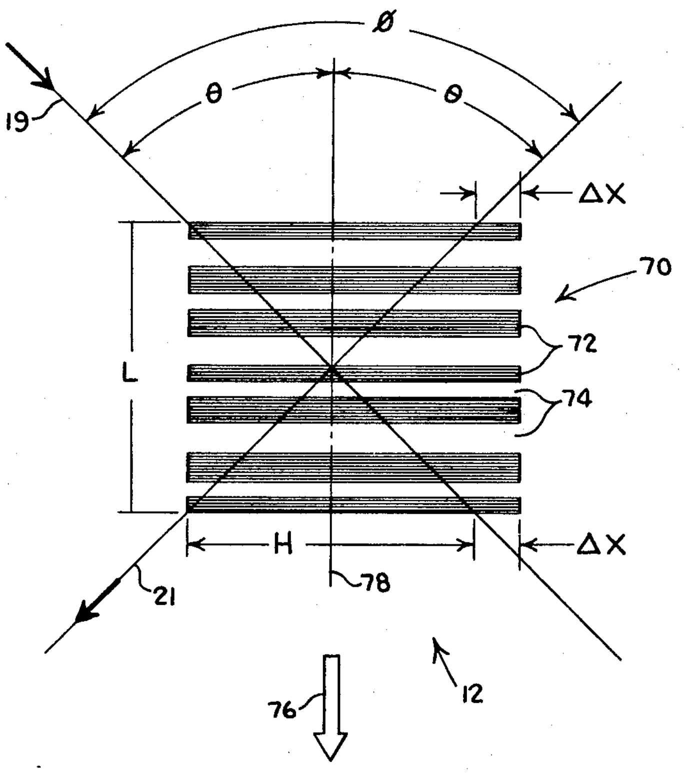
FIG. 3 is a schematic illustration of the worst case orientation of a linear bar code while moving through the X scan pattern generated by the apparatus of either FIGS. 1 or 2.

Specifically, as seen in FIG. 3, a linear bar code, generally indicated at 70 and consisting of alternating bar code elements 72 and space code elements 74, is illustrated as having a length L and a height of $H + \Delta X$, wherein the dimensions L and H are equal. Bar code 70 is moved through X scan pattern 12 generally in the direction indicated by arrow 76 and is illustrated in FIG. 3 in its "worst case" orientation relative to the two X scan traces 19 and 21. As such, the longitudinal axis 78 of bar code 70 is oriented at an angle $\theta$ equal to 45° relative to each of the traces 19 and 21. The acceptance angle of bar code 70 is twice the angle $\theta$ or the angle $\phi$.

It will be appreciated that if the bar code 70 is angularly rotated in either direction from its orientation shown in FIG. 3, the angular displacement between its longitudinal axis 78 and one or the other of the traces 19 and 21 decreases, thus increasing the number of times one of the traces will intersect all of the code elements of the bar code as it moves through the X scan pattern. In the worst case condition shown in FIG. 3 it will be seen that the number of times the traces 19 and 21 intersect all of the code elements of bar code 70 is dependent upon the dimension of $\Delta X$ by which the overall height of the bar code exceeds its overall length. The dimension $\Delta X$ is thus selected on the basis of the repetition rate of the X scan pattern and the anticipated maximum velocity of movement of the bar code 70 through the X scan pattern, e.g., 100 inches per second.

That is, for the worst case condition shown in FIG. 3, if traces 19 and 21 repeat at least once during the time the bar code 70 moves through a distance equal to $\Delta X$ multiplied by the cotangent of the angle $\theta$, it is assured that each trace will intersect all of the code elements at least once during the movement of the bar code through the X scan pattern. Since the angle $\theta$ is 45° in the illustration of FIG. 3, this increment of bar code movement during which the traces 19 and 21 must repeat is also equal to $\Delta X$.

It will be appreciated that the passage of bar code 70 need not extend generally through the center of the X scan pattern 12, but may be displaced to either side of center and each trace 19, 21 will nevertheless intersect each code element at least once. Since the field of view of the X scan pattern 12 may be as large as a 5 inch square and the bar code length and height as small as 1.5 inches for a nine character length, alignment of the bar code path of movement with the X scan pattern is not a significant problem. It is in this connection that the X scan pattern 12 is oriented such that the nominal path of label movement indicated by arrow 76 is displaced from the traces 19 and 21 by the angle $\theta$. It can be seen that if the path of bar code movement is parallel to one of the traces, it would be necessary to insure that the bar code area straddle the trace parallel to the direction of bar code movement if a read is to be obtained for all bar code orientations. This would pose more stringent alignment problems for the operator.

It will be appreciated that while the X scan pattern of the present invention is ideally suited for reading a linear bar code in transit regardless of orientation, wherein the bar code height exceeds its length, it will be understood that a bar code without this dimensional restraint can be read with some limitation imposed on its orientation relative to the X scan pattern during its movement therethrough. In other words, a bar code having a length exceeding its height can be read so long as provisions are made for accommodating the more limited acceptance angle inherent thereto.

Alternatively, acceptance angles less than 90° can be read without orientational restraints if the number of traces is increased. For example, utilizing the teachings of the present invention, a scan pattern having three traces can accommodate bar code read acceptance angles down to 60°.

It will thus be seen that the objects of the invention made apparent from the foregoing description are efficiently attained and, since certain changes may be made in the above constructions and in carrying out the above process without departing from the scope of the invention, it is intended that all matter contained in the above description or shown in the accompanying drawings shall be interpreted as illustrative and not in a limiting sense.

Having described the invention, what is claimed as new and desired to be secured by Letters Patent is:

1. A system for reading an optically coded ticket attached to an item being moved upon the reading area of a supporting member through which light may pass, said system including:

a. a light beam source;

b. a beam splitter for dividing the output beam of said source into a pair of split beams;

c. a rotating drum spaced relative to the surface of the supporting member opposite the item and having a polygonal peripheral surface divided into two side-by-side channels, the flat surface segments in each said channels being alternately reflective and non-reflective as arrayed around the periphery of said drum, the reflective and non-reflective surface segments in one of said channels being out of phase with said reflective and non-reflective surface segments in the other of said channels, one of said split beams being directed for impingement onto one of said channels and the other of said split beams being directed for impingement on the other of said channels of said drum;

d. means for optically rotating the direction of sweep of at least one of said split beams whereby an orthogonal relationship is produced between said split beams to generate an X-scan pattern over the reading area as a pair of alternating traces oriented 90° to each other; and e. a detector situated to respond to light from the optically coded ticket while in the reading area.

2. The system of claim 1 wherein said light beam source is a laser.

3. A system for reading an optically coded ticket attached to an item being moved upon the reading area of a supporting member through which light may pass, said system comprising:

a. a light beam source;

b. a beam splitter for dividing the output beam of said source into a pair of split beams;

c. a rotating drum spaced relative to the surface of the supporting member opposite the item and having a polygonal surface periphery such as to provide a plurality of reflective flat surface segments arrayed around its periphery;

d. means for directing said split beams for impingement on different ones of said reflective surface segments from relative positions such as to sweep said split beams reflected from said segments toward the supporting surface;

e. means for optically rotating the direction of sweep of at least one of said split beams to produce an orthogonal relationship therebetween, thereby to generate an X-scan pattern through the reading area as a pair of alternating traces oriented 90° to each other; and f. a detector situated to respond to light from the optically coded pattern while in said reading area.

4. The system of claim 3 wherein said light beam source is a laser.

* * * * *